United States Patent [19]
Maitland et al.

[11] Patent Number: 5,287,370
[45] Date of Patent: Feb. 15, 1994

[54] LASER APPARATUS

[75] Inventors: Arthur Maitland, St. Andrews; Ewan S. Livingstone, Kinross, both of Scotland; Brian P. Condon, Maidstone, United Kingdom

[73] Assignee: EEV Limited, Chelmsford, United Kingdom

[21] Appl. No.: 916,836

[22] PCT Filed: Nov. 14, 1991

[86] PCT No.: PCT/GB91/02010
§ 371 Date: Aug. 12, 1992
§ 102(e) Date: Aug. 12, 1992

[87] PCT Pub. No.: WO92/09125
PCT Pub. Date: May 29, 1992

[30] Foreign Application Priority Data

Nov. 14, 1990 [GB] United Kingdom ............... 9024733

[51] Int. Cl.$^5$ .................. H01S 3/04; H01S 3/045
[52] U.S. Cl. .................................................. 372/35
[58] Field of Search .............. 372/35, 86, 35, 56

[56] References Cited

U.S. PATENT DOCUMENTS

| | | | |
|---|---|---|---|
| 3,654,567 | 4/1972 | Hodgson | 331/94.5 |
| 3,895,313 | 7/1975 | Seitz | 372/35 |
| 4,237,430 | 12/1980 | Liu . | |
| 4,594,716 | 6/1986 | Guch . | |
| 4,817,108 | 3/1989 | Allcock | 372/35 |

FOREIGN PATENT DOCUMENTS

| | | |
|---|---|---|
| 1044999 | 10/1966 | United Kingdom . |
| 1283877 | 8/1972 | United Kingdom . |
| 1296797 | 11/1972 | United Kingdom . |
| 0167347A2 | 1/1986 | European Pat. Off. . |
| 438227A3 | 7/1991 | European Pat. Off. . |
| WO84/02233 | 6/1984 | PCT Int'l Appl. . |
| 2043330A | 10/1980 | United Kingdom . |
| 2126777A | 3/1984 | United Kingdom . |

OTHER PUBLICATIONS

M. Cem Gokay et al., "Description of a Compact 534.1 nm Neutral Manganese Vapor Laser"; *IEEE Journal of Quantum Electronics*, vol. QE-18, No. 2, Feb. 1982, pp. 154-155.

*Primary Examiner*—Rodney B. Bovernick
*Assistant Examiner*—Robert E. Wise
*Attorney, Agent, or Firm*—Spencer, Frank & Schneider

[57] ABSTRACT

A metal vapor apparatus comprising a laser tube within which laser action occurs during operation of the apparatus, and means for applying a liquid metal coolant to the tube.

15 Claims, 2 Drawing Sheets

LASER APPARATUS

BACKGROUND OF THE INVENTION

This invention relates to a laser apparatus and more particularly to apparatus in which metal vapour forms the laser amplifying medium.

Lasers which use metal vapour as the amplifying medium, for example copper or gold vapour, are, typically, of cylindrical geometry and require a high temperature to be maintained in the laser tube within which laser amplification occurs. This high temperature is necessary to maintain the metal vapour at a suitable operating pressure which is typically about one torr as a partial pressure within a buffer gas, which nay have any pressure up to hundreds of torr. For example, in a copper vapour laser, it is necessary to maintain the temperature within the laser tube at about 1600° C. This type of laser may be termed a pure-metal high temperature (PMHT) laser. In presently available copper vapour lasers of the PMHT type, this is achieved by using thermally insulating material around the laser tube so as to reduce heat losses to a minimum and attain the high temperatures required.

Also, in copper vapour lasers, it is current practice to place the thermally insulating material and the laser tube which confines the discharge together within a vacuum envelope.

Thus, where high temperatures are required, there is a large amount of insulating material to be outgassed within the vacuum envelope. The nature and quantity of the thermally insulating materials used at the high temperatures involved make for excessively long outgassing times following exposure to the ambient atmosphere during routine service operations, such as reloading with copper and cleaning the laser windows.

The large amount of thermal insulating materials present both a large thermal capacity and a high thermal impedance, with the result that typical times required for a laser of average power for example, 20 Watts, to attain its operating temperature are about 60–90 minutes.

In another class of metal vapour laser, the amplifying medium is derived from a metal halide which vaporises to form a molecular gas of metal halide at lower temperatures than those required to produce comparable vapour pressures from a solid metal. This type of laser may be termed a metal-halide low temperature (MHLT) laser. When an electrical discharge pulse is passed through the metal halide vapour, the halide dissociates into metal atoms or molecules and halogen atoms or molecules. If a second discharge pulse is then passed before the metal and halogen atoms or molecules can recombine, the metal atoms may be excited to the same energy levels as those which participate in the PMHT laser. For example, in a copper vapour laser, copper bromide may be used. For copper bromide, temperatures in the region of 600–700 degrees C. are sufficient to produce the required partial pressures. However, although these temperatures are relatively low when compared to a laser in which the metal vapour is produced from solid metal, it is still common practice to provide a relatively large mass and volume of thermally insulating material around the laser tube to enable the system to be heated from room temperature to the operating temperature and also to ensure that at the operating temperature, power applied to the amplifying medium is available to the laser process.

SUMMARY OF THE INVENTION

The present invention seeks to provide improved metal vapour laser apparatus in which high output powers may be achieved.

According to the invention, there is provided metal vapour apparatus comprising a laser tube within which laser action occurs during operation of the apparatus and means for applying a liquid metal coolant to the tube.

The inventors have realised that it is possible to dispense with the large amounts of insulating material previously thought necessary and yet achieve efficient laser operation at high temperatures. By cooling the laser tube, greater input powers may be used which thus result in higher laser output powers. In operating any gas discharge laser, a steady state is ultimately reached in which the power delivered to the gas by the discharge is balanced by the power removed from the gas. In a conventional laser, there are a number of constraints imposed on the designer. The temperature at the axis of the discharge must be kept close to the optimum value required for laser operation. The temperature value at the outer surface of the vacuum enclosure must be chosen by considering the maximum operating temperatures set by properties of the materials used, their resistance to thermal shock and environmental requirements. Once the temperature at the outer surface has been chosen, then the surface area necessary for transfer of the input power from the outer surface of the vacuum enclosure is also necessarily fixed. Concentric tubes of materials with poor thermal conductivity are conventionally usually used in a coaxial arrangement between the longitudinal axis of the laser tube and the outer surface of the vacuum enclosure to retain heat in the discharge region. The dimensions and the surface temperatures of these concentric tubes are set at temperature values intermediate between the inner-most temperature and the temperature of the outer surface by the power which is input into the discharge and by the thermal conductivities of the materials chosen. Once the dimensions and materials have been selected to cope with a given input power, any attempt to vary the input power of the laser results in non-optimum laser operation because it invariably results in a change in the optimum operating temperature at the axis. Thus, conventional designs based on large temperature gradients and fixed geometries are inflexibly confined to a narrow range of optimum operating conditions.

In contrast to previously known metal vapour lasers, by employing the invention, a much larger range of input powers is available whilst still enabling the optimum operating temperature to be maintained.

The liquid metal coolant effectively provides a regime which is capable of maintaining a temperature which is uniform to within approximately one degree C. anywhere in the range from ambient temperature to the boiling point of the coolant at atmospheric pressure.

By using a molten metal, for example, liquid tin, as the heat exchange medium, a number of the problems associated with maintaining high operating temperatures at up to 2000K at input powers of up to 100 kW, or greater, may be removed from inside the vacuum envelope to outside it where some of them cease to exist and others are much easier to deal with. As a coolant for a laser, liquid metal enables the highest obtainable input power density to be achieved without compromising the optimum operational conditions of the laser.

Preferably, the coolant is tin. Tin melts at 232 degrees C., boils at 2260 degrees C. and is relatively inert with respect to metals and alloys commonly used as laser containment vessels. However, other coolants could be suitable. For example, lead or low temperature alloys such as solder may be used. Another suitable material could be Woods metal which is liquid below the boiling point of water. The material used for the laser tube is selected by considering properties such as thermal conductivity, resistance to thermal shock, electrical conductivity, inertness in the presence of potentially reactive atoms, molecules, ions and free radicals, and the temperature range over which it may be cycled. The laser tube may be of beryllia for PMHT lasers and quartz for MHLT lasers.

In a particularly advantageous embodiment of the invention, the coolant metal is arranged to be present in both the liquid and solid states so as to exploit the latent heat of fusion. The boundary region between the solid and liquid states consists of a thin layer in which latent heat is being released or absorbed. The use of a coolant exhibiting a change of state provides a self-regulating method of thermal management. The interface between the solid and liquid coolant changes its position according to the power delivered to the discharge. As higher input powers are employed, the boundary moves outwardly away from the discharge in the laser tube and conversely, if a lower input power is used, the volume of the boundary layer is reduced as the boundary moves towards the tube axis. Thus, thermal management is principally achieved by exploiting latent heat of fusion rather than the conventional method which relies heavily on temperature gradients and fixed thermal conductivity and thus has no such regulating capability.

It may be preferred to include means for externally heating the coolant via a containing jacket. Conventional heating elements may be used to attain the laser operating temperature without discharge heating or in combination with discharge heating. By using external heating, the required temperature can be obtained relatively quickly and it is also more convenient than the conventional method of using only discharge heating.

In a particularly advantageous embodiment, the coolant is contained within a jacket arranged coaxially about the laser tube and preferably, means are included for flowing another coolant over the outer surface of the jacket. This other coolant may conveniently be water.

In a preferred embodiment of the invention, the coolant metal acts as return path for electrical current. Such an arrangement is of particularly low inductance and may be less than 500 nH/m depending on the ratio r2/r1, where r2 is the inner radius of the outer conductor, that is the coolant, and r1 is the radius of the discharge. As there is only one wall thickness of a few millimeters between the discharge and the current return path, the inductance of the discharge circuit may be as low as 100 nH/m and, depending on the wall thickness of the vacuum enclosure, it could approach the theoretical limit of 78 nH/m. Thus, a current pulse having a short rise time may be obtained, giving an increase in efficiency.

In operating a metal vapour laser of either the PMHT or MHLT types, the metal vapour may be produced from solid metal located within the tube or from a metal halide. For example, copper bromide may be formed within the tube by flowing the halogen gas over the surface of metal within the tube. Heating of the laser amplifying medium may be achieved using a discharge produced between electrodes located within the tube. A flow of liquid metal as a coolant over the outer surface enables high repetition rates to be used.

BRIEF DESCRIPTION OF THE DRAWINGS

One way in which the invention may be performed is now described by way of example with reference to the accompanying drawings in which.

DESCRIPTION OF THE PREFERRED EMBODIMENTS

Figure 1:
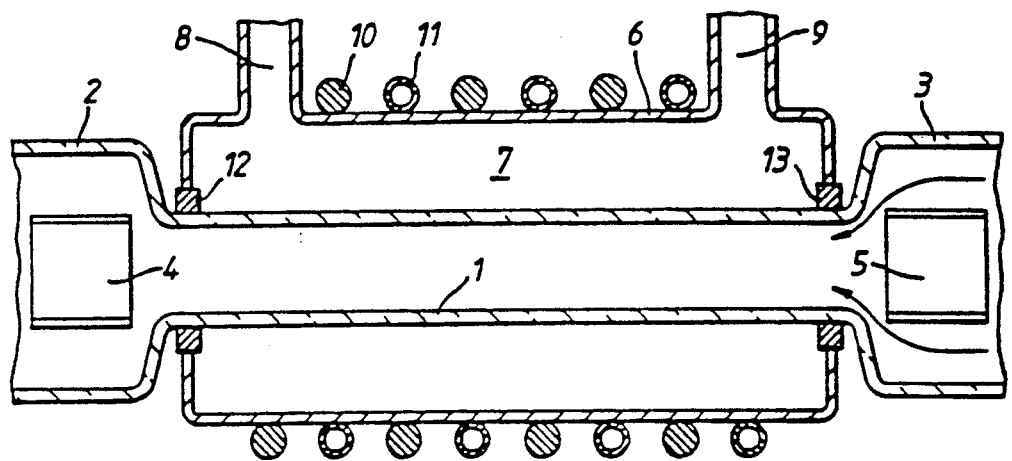
FIG. 1 is a schematic longitudinal section through a laser in accordance with the invention.
Figure 2:
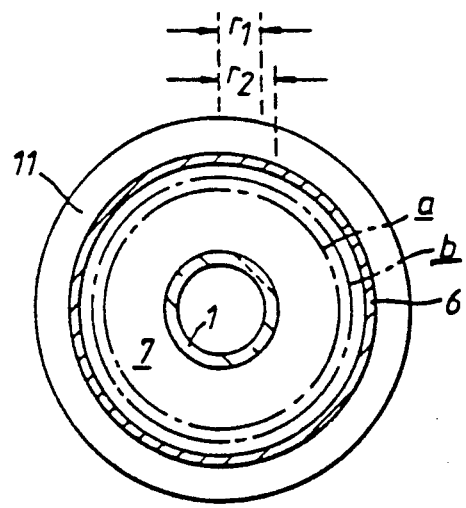
FIG. 2 is a schematic transverse section of the laser shown in FIG. 1.

With reference to FIGS. 1 and 2, a copper vapour laser includes a laser tube 1 within which laser amplification occurs during operation of the apparatus. The laser tube 1 is of quartz and has an internal radius of 1 cm and a wall which is approximately 2 mm thick. The tube includes end portions 2 and 3 of increased radius within which are located copper electrodes 4 and 5. The quartz tube 1 is axially surrounded by a cylindrical stainless steel jacket 6 having entry and exit ports 8 and 9 at each end. The volume 7 defined by the jacket 6 and the laser tube 1 is filled with a metal coolant during operation of the laser. A heater element 10 is wound helically around the outer surface of the jacket 6 as is a conduit 11 through which water is arranged to flow when cooling is required. Gaskets 12 and 13, made from rockwool, prevent leakage of metal from the jacket.

Prior to operation of the laser, tin in a particulate form is introduced into the volume 7 via ports 8 and 9. When laser output is required, copper bromide is produced within the tube 1 by flowing bromine or hydrogen bromide mixed with an inert gas through the laser so that it passes over the hot surface of at least one of the copper electrodes 4 and 5 as illustrated by the arrows. Heater current is passed through the element 10 to cause the tin within the volume 7 to become molten and to supply heat to the interior of the laser tube 1. Discharges are produced between the electrodes 4 and 5 to cause heating and dissociation of the copper bromide and excitation of the resulting copper vapour.

When the discharge is of a higher temperature than the molten tin surrounding the laser tube 1, the molten tin cools the tube 1, removing whatever is delivered to the discharge in operating the laser. Once the operating temperature is reached, the heater current through the element 10 is stopped and water is arranged to flow through the conduit 11. The cooling effect to the outer surface of the jacket 6 so produced, causes tin in contact with the inner wall of the jacket 6 to solidify, The tin thus exists in the volume 7 in both a liquid form, adjacent to the outer wall of the tube 1, and a solid form adjacent the inner wall of the jacket 6. The cylindrical interface between the two states is indicated in FIG. 2 by the broken line a. If it is wished to obtain an increased power output from the laser apparatus, the power supplied via the discharge is increased. This results in the amount of molten tin within the volume 7 increasing and the radius at which solidification occurs increases to that shown as b in FIG. 2.

The bath of tin surrounding the laser tube 1 can act as a heater in starting the laser and as a cooler whilst the laser is operating. In addition, it is also electrically connected to form a current return path which is coaxial with the laser discharge. The inductance of the arrangement is dependent upon the ratio r2/r1, where r2 is the inner radius of the outer conductor and r1 is the radius of the discharge, as shown in FIG. 2.

Figure 3:
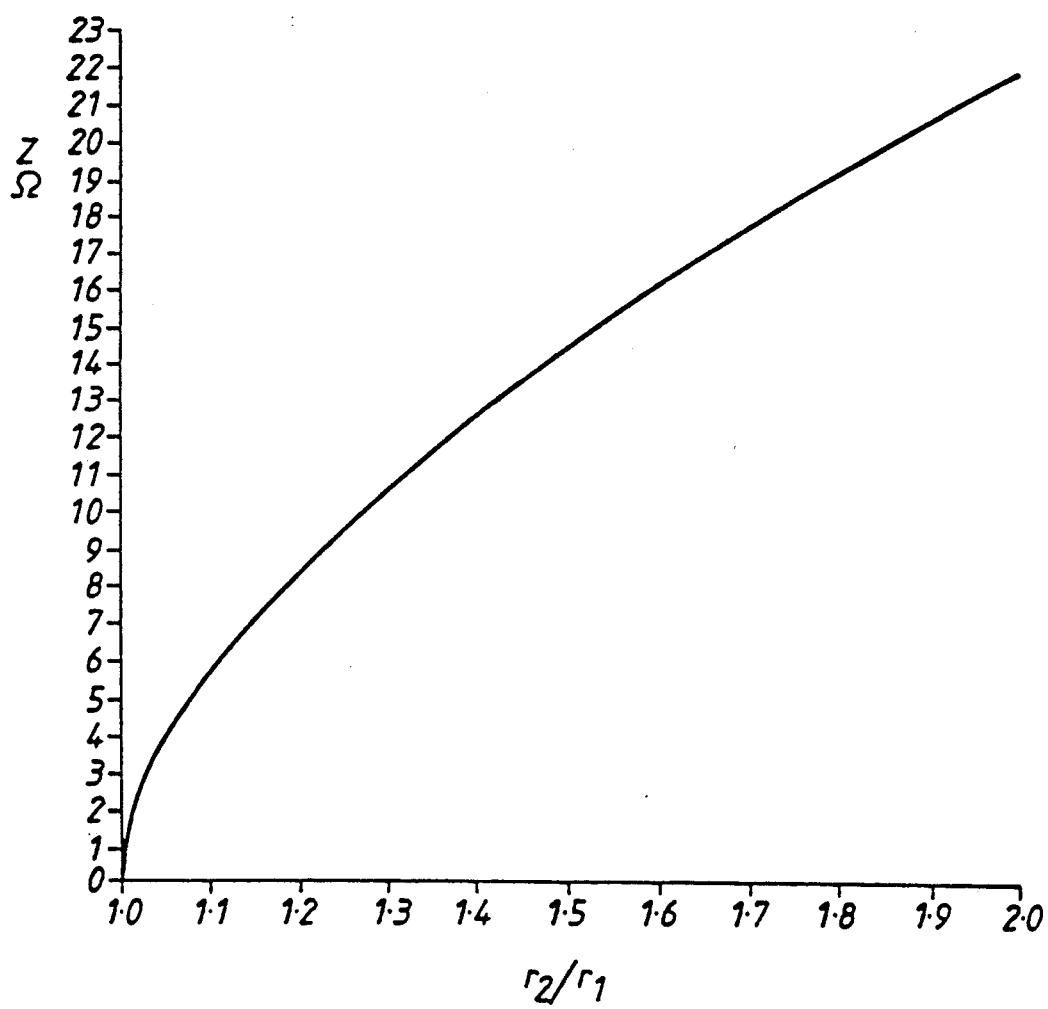
FIG. 3 is an explanatory diagram.

FIG. 3 is a graph showing the relationship of the impedance Z as a function of r2/r1 for quartz, which has a relative dielectric constant k of approximately 5. A typical value for the ratio of the r2/r1 for laser apparatus in accordance with the invention is 1.1 giving an impedance of 5 ohms which enables good matching to be achieved with the characteristically low output impedance of the pulse modulator which drives the laser apparatus.

Although advantages accrue by using a metal coolant in which both liquid and solid states are present so as to exploit the latent heat of fusion, the arrangement may still be advantageously operated where the metal coolant is present only in its molten form. The rapid conduction of heat away from the laser tube 1 enables high input powers to be employed.

The molten metal in the volume 7 may operate with free convection or alternatively pumps may be employed to cause it to flow through the volume 7 at a rate which maintains the outer surface of the laser tube 1 at a suitable temperature. By supplying the outer surface of the jacket 6 with cooling water, input powers up to 100 kW may be dissipated with flow rates of up to about 0.8 liters per second for a 30 degree C. rise in water temperature. The tin in contact with the inner surface of the jacket 6 solidifies, yielding its latent heat of fusion to the cooling water.

The laser apparatus described with reference to FIGS. 1 and 2 is based on a metal halide operation. However, laser apparatus in accordance with the invention nay employ pure metal, for example copper requiring a temperature within a discharge within approximately 1550 degrees C. within the discharge tube. In this case, sapphire or beryllia are suitable materials for the laser tube.

We claim:

1. Metal vapour laser apparatus comprising a laser tube within which laser action occurs during operation of the apparatus and means for applying a liquid metal coolant to the tube.

2. Laser apparatus as claimed in claim 1 wherein during laser operation, the coolant metal is simultaneously present in both the solid and liquid states.

3. Laser apparatus as defined by claim 2 wherein said coolant is tin.

4. Laser apparatus as claimed in claim 1 wherein the coolant is tin.

5. Laser apparatus as claimed in claim 1 wherein the coolant is arranged to flow over the outer surface of the tube.

6. Laser apparatus as claimed in claim 1 wherein the coolant acts as a return path for electrical current.

7. Laser apparatus as claimed in claim 1 wherein a substantially cylindrical jacket is arranged coaxially about the laser tube and coolant is located in the volume between them.

8. Laser apparatus as claimed in claim 7 and including means for flowing another coolant over the outer surface of the jacket.

9. Laser apparatus as claimed in claim 7 and including means for externally heating the jacket containing the coolant.

10. Laser apparatus as claimed in claim 1 wherein heating of laser amplifying medium to produce laser action is obtained using a discharge established between electrodes within the tube.

11. A metal vapor laser apparatus comprising
an elongated laser tube having first and second ends, laser action occurring within said tube during operation of said apparatus;
a jacket surrounding said laser tube, said laser tube and said jacket defining a volume therebetween; and
a metal coolant located within said volume.

12. Laser apparatus as defined by claim 11 which further comprises means for introducing said metal coolant into the volume between said jacket and said laser tube, said metal coolant being in particulate form.

13. Laser apparatus as defined by claim 12 which further comprises heating and cooling means surrounding said jacket, said heating means melting said metal coolant thereby causing it to become molten, and said cooling means thereafter cooling an outer surface of said jacket thereby causing the metal coolant in contact with an inner wall of said jacket to solidify and the metal coolant in contact with an outer surface of said laser tube to remain molten.

14. Laser apparatus as defined by claim 13 wherein said metal coolant is tin.

15. Laser apparatus as defined by claim 11 wherein electrodes are provided at each end of said laser tube to establish a discharge therebetween, said discharge heating a laser amplifying means to produce said laser action.

* * * * *